United States Patent [19]

Harold

[11] 4,221,422
[45] Sep. 9, 1980

[54] VEHICLE TRANSPORT TRAILER

[76] Inventor: Billy E. Harold, 6869 Oldham St., Taylor, Mich. 48180

[21] Appl. No.: 890,236

[22] Filed: Mar. 27, 1978

Related U.S. Application Data

[63] Continuation-in-part of Ser. No. 692,060, Jun. 2, 1976, Pat. No. 4,106,805, which is a continuation-in-part of Ser. No. 590,196, Jun. 25, 1975, Pat. No. 3,994,523, which is a continuation of Ser. No. 452,237, Mar. 18, 1974, abandoned.

[51] Int. Cl.² .............................................. B60P 3/08
[52] U.S. Cl. ...................................... 410/26; 296/1 A
[58] Field of Search ................... 296/1 A; 105/368 R

[56] References Cited

U.S. PATENT DOCUMENTS

| 1,809,557 | 6/1931 | Lishon | 296/1 A |
| 3,104,127 | 9/1963 | Swartzwelder | 296/1 A |
| 3,343,865 | 9/1967 | Stuart | 296/1 A |
| 3,589,767 | 6/1971 | Stuart | 296/1 A |

Primary Examiner—John J. Love
Assistant Examiner—John A. Carroll

[57] ABSTRACT

A vehicle transport tractor and trailer of the stinger-steered type including a specialized sliding track and pivotal head ramp used in connection with the tractor. The combination is capable of transporting a load of nine large cars, or as many as ten small cars with equal facility. The tractor and trailer combination is likewise capable of handling an important variety of mixed loads which are commercially needed and include vans and pick-up trucks as well as conventional cars and station wagons.

8 Claims, 32 Drawing Figures

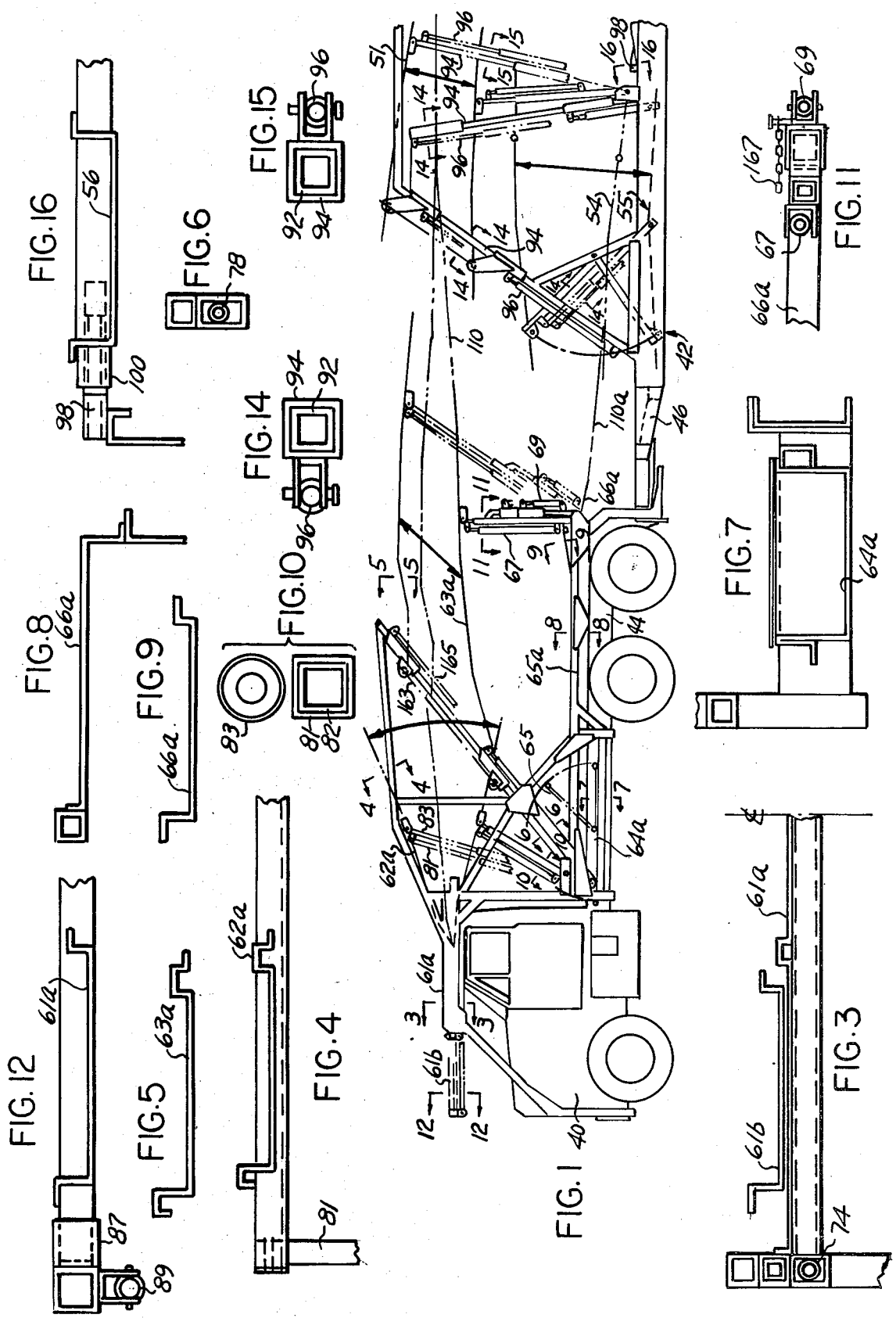

VEHICLE TRANSPORT TRAILER

REFERENCE TO RELATED APPLICATIONS

This application is a continuation-in-part of my U.S. application Ser. No. 692,060, filed on June 2, 1976, now issued as U.S. Pat. No. 4,106,805, for "Vehicle Transport Trailer" which application in turn is a continuation-in-part of my U.S. application Ser. No. 590,196, filed on June 25, 1975, now issued as U.S. Pat. No. 3,994,523, which application in turn is a continuation of my U.S. application Ser. No. 452,237, filed on Mar. 18, 1974 and now abandoned.

BACKGROUND OF THE INVENTION

This invention relates to a "stinger-steered" trailer which is a trailer with a low height mounting such that a supporting horizontal framework is built to the rear of the rear wheel of the tractor. The horizontal support is generally below the center line of the axles of the rear wheels on the tractor. Other vehicle transport systems utilizing head ramp tracks of one type or another but requiring extensive vertical support structure forward of the tractor itself are shown in the following U.S. patents: U.S. Pat. No. 3,690,717, issued on Sept. 12, 1972 to Taylor for "Vehicle Transport"; U.S. Pat. No. 3,343,865 issued on Sept. 26, 1967 to Stewart for "Vehicle Transport"; U.S. Pat. No. 3,084,970 issued to Day on Apr. 9, 1963, for "Vehicle Carrying Tractor-Trailer"; and U.S. Pat. No. 3,589,767 issued on June 29, 1971 to Stewart for "Vehicle Transport." None of these prior art references shows a head ramp structure or trailer comparable in construction or function to that of the present invention.

SUMMARY OF THE PRESENT INVENTION

The present invention relates to stinger-steered vehicle transport trailers with a novel tractor head ramp allowing for carriage of a forward vehicle with or without overhang in accordance with the particular state law which may control the situation. The present invention further relates to a novel arrangement of intermediate and rear tracks on the trailer which in combination with the head ramp arrangement and the allowable order of loading and unloading provides a greatly increased capacity of vehicle on the combined tractor and trailer and, further, a greatly increased variety of mixed loads which may be required to allow for the necessary mix of vehicles from factory or assembly plant to the individual dealers.

BRIEF DESCRIPTION OF THE DRAWINGS

A complete explanation of the present invention will be provided with reference to the accompanying specification and to the several drawings in which like parts are identified with like numerals where they appear in the several views, and wherein:

FIG. 1 is a side elevational view of the forward half of a vehicle transport tractor and trailer incorporating the present invention;

FIG. 3 is a fragmentary vertical sectional view along the section line 3—3 of FIG. 1;

FIG. 4 is a sectional view taken along the section line 4—4 of FIG. 1;

FIG. 5 is a sectional view taken along the vertical section line 5—5 of FIG. 1;

FIG. 6 is a sectional view taken along the section line 6—6 of FIG. 1;

FIG. 7 is a vertical sectional view taken along the section line 7—7 of FIG. 1;

FIG. 8 is a vertical sectional view taken along the section line of 8—8 of FIG. 1;

FIG. 9 is a sectional view taken along the section line 9—9 of FIG. 1;

FIG. 10 is a sectional view taken along the section line 10—10 of FIG. 1;

FIG. 11 is a sectional view taken along the section line 11—11 of FIG. 1;

FIG. 12 is a fragmentary vertical sectional view taken along the section line 12—12 of FIG. 1;

FIGS. 14 and 15 are sectional views taken along the several section lines of FIGS. 1 and 2;

FIG. 16 is a fragmentary sectional view taken along the section line 16—16 of FIG. 1;

FIGS. 19 through 31 are side elevational views of a partially schematic type illustrating a number of loadings and mixed loadings of both commercial and passenger vehicles in which;

FIG. 19 shows a mixed load of three station wagons and five large cars;

FIG. 20 shows a mixed load of three station wagons and six large cars;

FIG. 21 shows a load of nine small cars with option loading for two large cars;

FIG. 22 shows a load of ten small cars;

FIG. 23 shows a mixed load of nine large cars;

FIGS. 24 and 25 show a load of ten small cars with option for three large cars;

FIG. 26 shows a load of nine large cars;

FIG. 27 shows a mixed load of four vans and 2 large cars;

FIG. 28 shows a mixed load of two vans and three large cars and three small cars;

FIG. 29 shows a load of seven pick-up trucks;

FIG. 30 shows a mixed load of five pick-up trunks and three large cars; and

FIG. 31 shows a mixed load of five "Bronco-type" vehicles and two pick-up trucks.

DETAILED DESCRIPTION OF THE INVENTION

Figure 18:
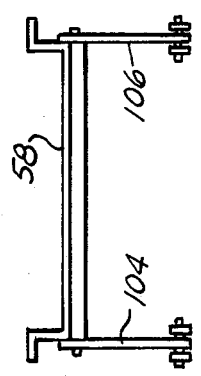
FIG. 18 is a sectional view taken along the section line 18—18 of FIG. 1A with a portion of the mechanism shown in partly phantom to illustrate the lower and upper track positions.

The vehicle transport of the present invention is shown in its entirety with the tractor 40 best shown in FIG. 1. The trailer is indicated generally by the numeral 42 in FIG. 2. The tractor 40 has a main frame 44 on which there is supported the forward end of the trailer 42. The trailer 42 has a main frame 46 which supports a superstructure including a number of rigid parallelly spaced and like vertical side members each fabricated from rigid structural members and connected in a common vertical frame to form a truss-like load supporting structure of a substantial vertical height and strength.

The trailer 42 further includes a number of different and separately actuated tracks, certain of which are moveable in a predetermined sequence and manner as will be described hereinafter to provide a versatility of loading capacity and of vehicle mix not possible with presently known vehicle transport systems. The several moveable tracks are generally shown in their lowermost position, in one or more intermediate positions, and finally in their uppermost position in solid line form. The three uppermost tracks on the trailer 42 are denoted by the numerals 51, 52, and 53 respectively. The lowermost tracks on the trailer 42 are denoted by the numerals 54, 55, 56 and 56a, 57 and 57a, and 58.

A further forward group of tracks is provided on the tractor 40 which includes a track 61a which is a permanent horizontal track, track 61b which is an adjustable and slidable horizontal track, track 62a which is adjustable at its rear end and at its front end is attached to the rear of the track 61a through a hinged connection. A further track 63a is attached at its front to a side panel to provide an inclined level position. The track 63a has coupled to it a hydraulic cylinder 163 and an associated telescoping tube 165 for raising it upward and downward. The track 64a is a permanent track and includes a wheel pocket positioned in it. It is equipped with a pocket cover 65 that is swingable through a 180° arc to rest flat against the horizontal surface, i.e. the top surface of the track 64a. The track 65a comprises a wheel housing positioned over the rear wheels of the tractor 40. Attached to the track 65a is an additional track 66a which track has a hinge point welded to the rear of the track 65a. At the rear portion of the track 66a there is provided a sliding tube associated with a hydraulic cylinder 67 which is operable to raise the rear of the track 63a. To the rear side of the telescoping tube associated with the hydraulic clyinder 67 is located a small short stroke cylinder 69 which is operable to lift the track 66a. It will be seen that the track 66a is required due to close tolerance clearances under the rear of the lower vehicle in relation to the vehicle which would be carried on the track 54 of the trailer.

FIG. 3 is a sectional view taken through the track 61a and it shows the horizontal sliding track 61b on top thereof with a hydraulic cylinder 74 located at the left-hand side of the drawing.

FIG. 4 is a cross-sectional view taken through the track 62a further showing the telescoping tube 81 for the raising and lowering of the track 62a.

FIG. 5 is a cross-sectional view taken through the track 63a.

FIG. 6 shows a cross-sectional view taken through the structure provided for carrying the cylinder 78 for lifting the front of the track 63a.

FIG. 7 represents a cross sectional view taken through the track 64a showing the pocket formed therein.

FIG. 8 is a cross sectional view showing the shape of the track 65a.

FIG. 9 is a cross section showing the configuration of the track 66a.

FIG. 10 is a cross section taken through the telescoping tubes 81, 82, and the cylinder 83 associated with the track 62a.

FIG. 11 is a section taken through the telescoping hydraulic tubes 85 at the rear of the track 63a.

FIG. 12 is a cross sectional view taken through the track 61a showing the hydraulic tube 87 and cylinder 89 for adjusting the track 61b forwardly or rearwardly.

Figure 13:
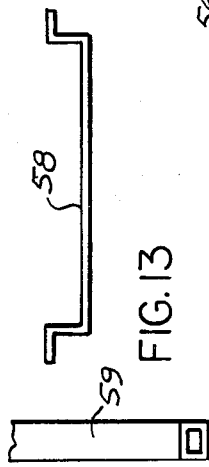
FIG. 13 is a fragmentary vertical sectional view taken along the section line 13—13 of FIG. 2.

FIG. 13 is a cross sectional view taken of the track 58 in the rear portion of the trailer 42.

Figure 2A:
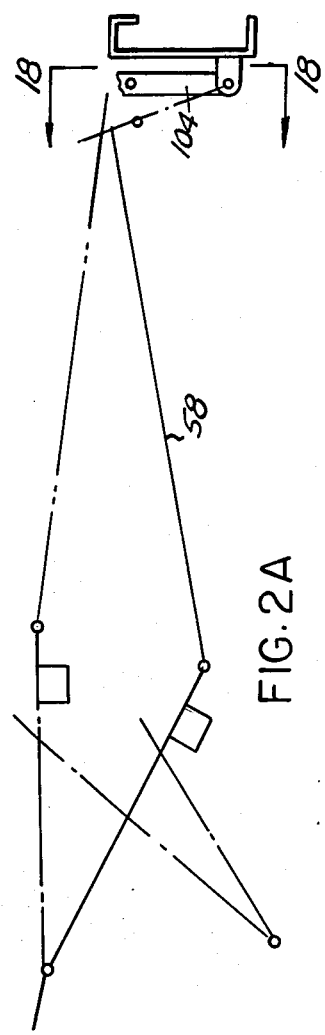
FIG. 2A is a partly schematic view of a portion of FIG. 2.
Figure 2:
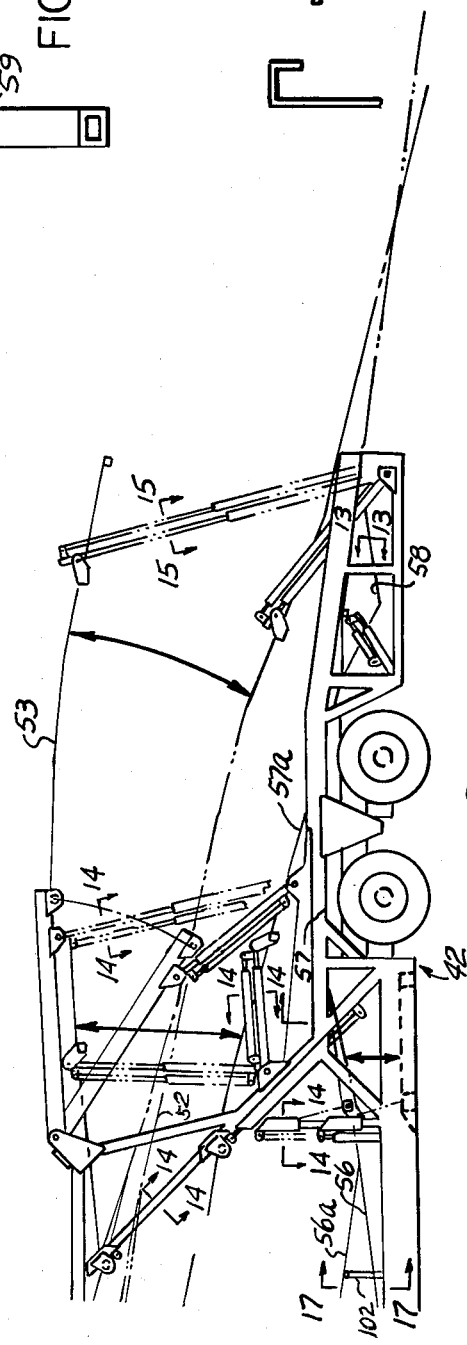
FIG. 2 is a side elevational view of the rearward half of the trailer of FIG. 1.

FIG. 14 is a cross section taken at various points on the drawings of FIGS. 1 and 2 showing in each case a telescoping tube 92 within a corresponding tube 94 and a hydraulic cylinder 96 coupled thereto for lifting or adjusting various parts of the associated tracks.

FIG. 15 is substantially the same as FIG. 14 but shows the cylinder 96 attached to the slider combination of tubes 92 and 94 in the rear instead of in the front.

FIG. 16 is a cross section taken at the front of the track 56 showing a sliding tube 98 located in a cross member 100 for supporting the front of the track 56 in its up or loading position.

Figure 17:
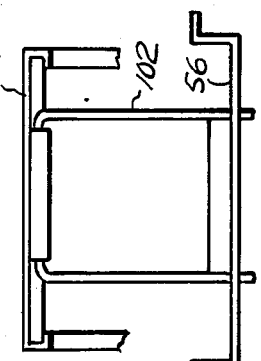
FIG. 17 is a fragmentary sectional view taken along the section line of 17-17 of FIG. 1A.

FIG. 17 is a section taken through the track 56 showing the track 56a lifted onto its associated stand 102.

FIG. 18 is a section taken of a pair of struts 104 and 106 connected to the rear of the track 58.

In each of the schematic drawings illustrating the different exemplary mixed vehicle loadings, that is in FIGS. 19 through 31, the vehicles carry a Roman numeral designation which shows the sequence in which they are loaded on the trailer 42. This sequence is, of course, sometimes critical with respect to handling of the several tracks involved, particularly with respect to their being elevated and lowered between the loading and carrying positions. Detailed descriptions will be given hereinafter for the representative loadings shown in FIGS. 19 through 31. The movement of the upper tracks 51, 52, and 53 is generally vertical and is accomplished in each case through an associated hydraulic of pneumatic elevating mechanism.

It will be understood that during the loading process it is necessary in some cases to temporarily position skids in order to bridge spaces left intermediate the several different tracks or between the rearward end of the trakc 53 or 58 and ground so that the vehicles may be loaded. Examples of such jumpers or loading skids are identified in FIG. 1 by the numerals 110 and 110a.

It will also be seen that each of the several tracks which are moveable between lowermost and uppermost positions have such positions indicated with the general path or arc of movement identified by arrow pointed leads. The intermediate or loaded position generally lies somewhere between the separated uppermost and lowermost positions. In certain of the loadings, the procedures followed are substantially the same so that it is possible to discuss these in groups. For example, for the nine car loadings shown in FIGS. 20, 21, 23 and 26, all of the upper tracks on both the tractor and trailer should be in their upward position to allow for the loading of the car I. Between the tractor 40 and the trailer 42, you would have a jumper skid 110a for spanning the gap between the track 65a and track 54. The track 56 on the trailer would be in the up position with the front of the track 56 resting on the adjacent side panel member for the trailer 42. The rear of the track 54 would then be lowered so that it would be approximately in line with track 56 at the rear. The front of the track 54 would be positioned in an upward or intermediate position for closing the incline for loading the car on the bottom of the tractor. The track 58 would be in its uppermost height adjustment. A loading skid would be positioned from the rear of the trailer to the ground and car I would be driven into its position behind the cab of the tractor. Next, the jumper skid would be stored or positioned between the rear of the track 63a overlapping the front of the track 51 on the trailer. The car II would be loaded into position and its rear end overlifted for providing under clearance for next loading the car III. The front of the track 56 would then be dropped down so that it would rest in line with the rear of the permanent track 55. The car III could thus be driven underneath the car II. The rear end of the track 56 would then be lowered and car III tied down. The car II could be lowered, still allowing ample clearance between it and the roof of the car III.

It is now in order to load the upper tracks of both tractor and trailer with cars IV, V, VI and VII. Tracks 51, 52, and 53 would be aligned and a jumper skid, not shown, used to bridge the tracks 51 and 63a would be raised and aligned with rear track portion of the track 51 brought down and rested on top of the track 52. A loading skid would then be connected to the rear of the track 53 for loading car IV across the top row of tracks. After car IV has been backed into position, the rear of track 62a will be overlifted. Track 63a is then lowered at its front end and at its rear end. Car V is then driven into position on the track 63a. After overlift of the rear of the track 63a, car VI is backed on. The front of the track 51 is lowered and the back raised. Car VII is driven on and overlifted on track 53 to permit loading of car VIII. The track 57a is adjusted to its front up position and track 52 is lowered down so the rear of track 52 rests on the front of track 57a. Car VIII is then backed on to the track 52. Track 57a is lowered. The front of the car VIII is then overlifted to allow for drive on of the car IX. Loading skids to ground are then removed. All cars are tied down and height adjusted within the allowable height limits for highway travel.

Figure 22:
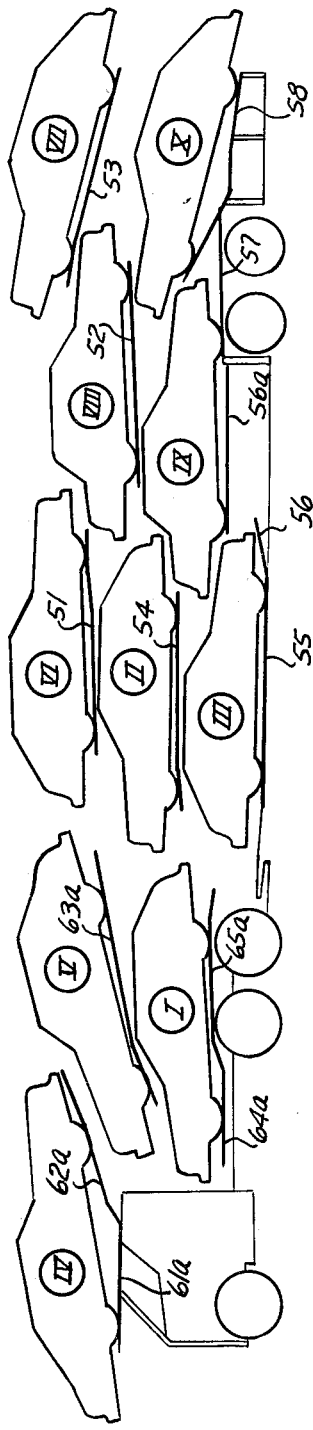
Figure 23:
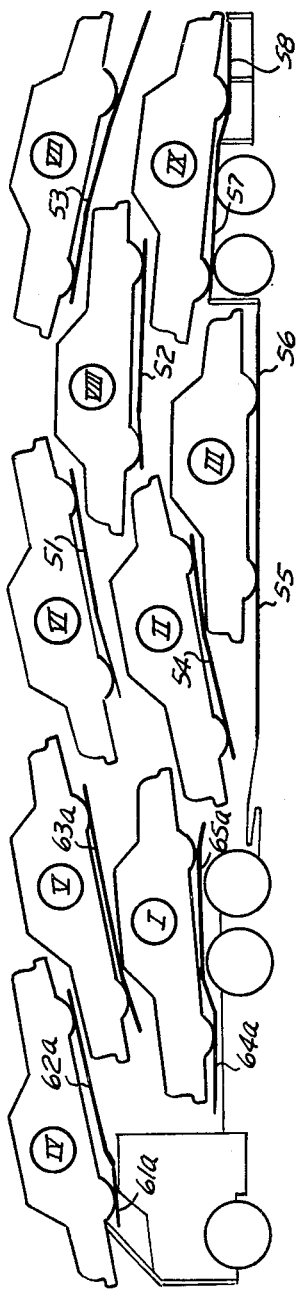
Figure 24:
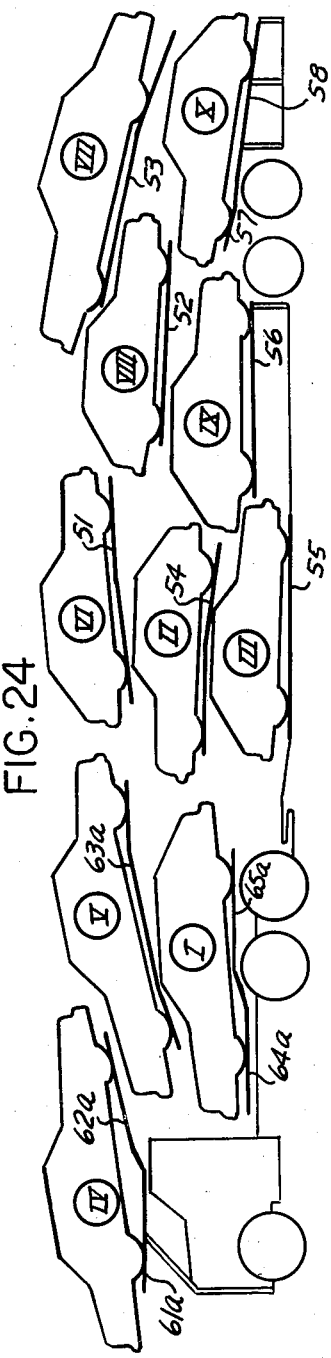
Figure 25:
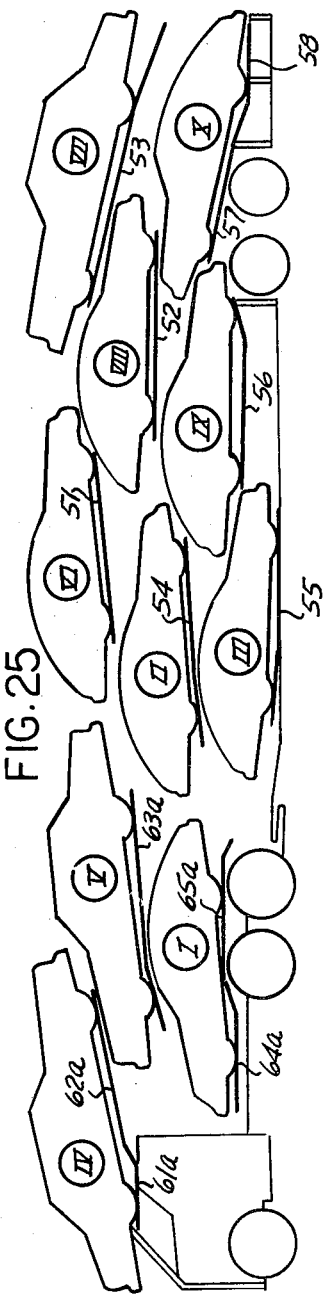
Figure 26:
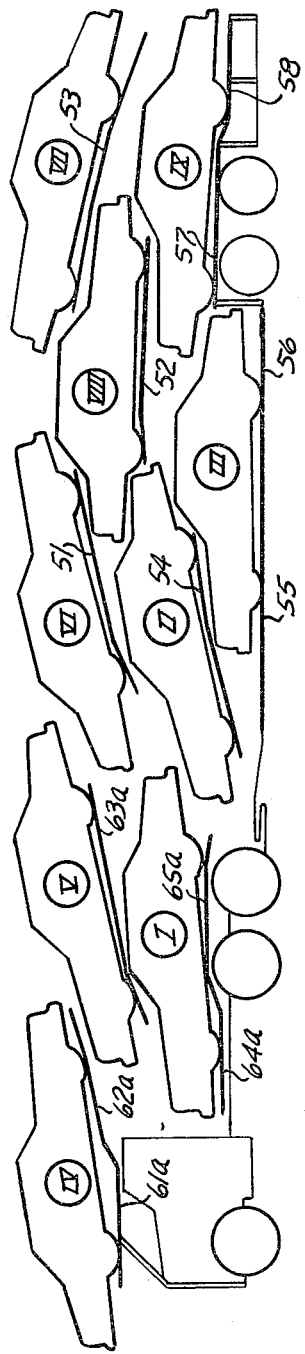

The loading procedure for the ten car loadings of FIGS. 22, 24 and 25 will now be described. As in the case of the nine car loading just discussed for FIGS. 20, 21, 23 and 26, the trailer 42 is loaded first. To permit this, upper tracks 62a, 63a, 51, 52 and 53 are all placed in a raised position. The track 56 would be in an up position with the track front resting on a side panel member of the trailer 42. The rear of the track 54 is brought down and its front up for closing an inclined path to the track 65a on the bottom of the tractor 40. A jumper skid 110a would be positioned between tracks 54 and 56. After a loading skid is positioned from the rear of the trailer to ground, car I can be driven into position behind the cab of the tractor. Then car II is driven into position and track 54 is overlifted in an upward position. The track 56 is then lowered down to line up with the permanent track 55. The car III is then backed in under the car II. The upper tracks 62a, 63a, 51 and 53 are then aligned to permit the sequential loading of cars IV and V. With tracks 51, 52 and 53 lined up, car VI is backed into position and its front over lifted. The car VII is then driven into position and lifted to extreme height. The track 52 is then lowered down so that its rear is resting on the track 57a which is in its raised position and car VIII is backed into position and its front overlifted. The front of track 56a is raised up and track 57a is lowered. Then car IX is backed into position. Track 57a is raised up and car X is driven into position. All cars are then adjusted for height and tied down for highway travel.

Figure 30:
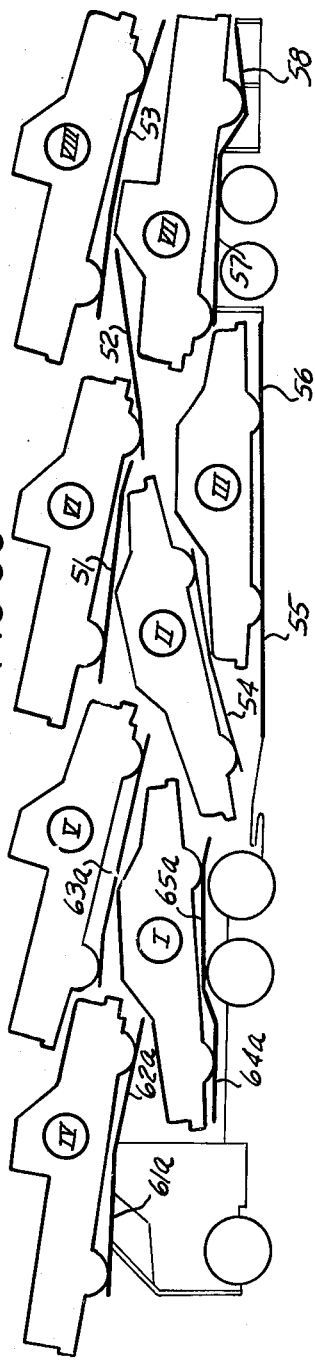

The loading for FIG. 30 is provided to handle five pickup trucks and three cars. The lower tracks are positioned in substantially horizontal alignment. Jumper skids are placed between track 58 and ground and further between track 65a and track 54 to bridge between tractor and trailer. Car I is then driven on. The skid is removed and car II is driven onto track 54 and its rear end overlifted. Track 56 has its front lowered to permit car III to be driven under car II onto track 55 and 56. The rear of the track 56 is then lowered to position car III in a substantially horizontal position. Car II is then adjusted downwardly but with allowance of adequate clearance between cars. The next step is to prepare for loading pickup trucks IV, V and VI on the upper tracks. All upper tracks are placed in alignment and pickup truck IV is backed into position and track 62a is dropped down so the truck IV is positioned thereon in a slightly inclined position. The pickup truck V is then backed into position on track 63a which is then height adjusted. Tracks 51, 52 and 53 are then adjusted into alignment for loading pickup truck VI. It is backed into position with its rear wheels resting on track 51 and its front wheels resting on track 52. The pickup truck VIII would then be backed on track 53 and then overlifted to an extreme height position. The pickup truck VII is driven on and then track 53 is lowered. The rear of the track 53 is adjusted to provide ample clearance between it and the roof of the pickup truck VII.

Figure 19:
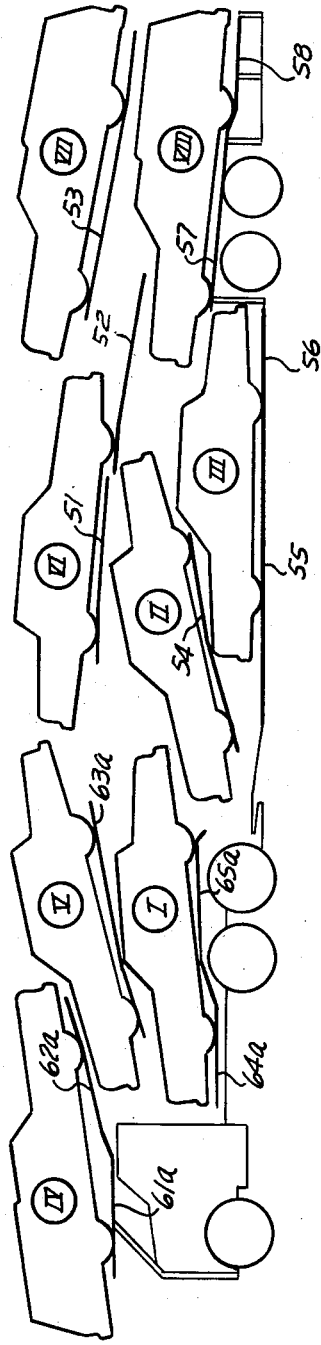
Figure 20:
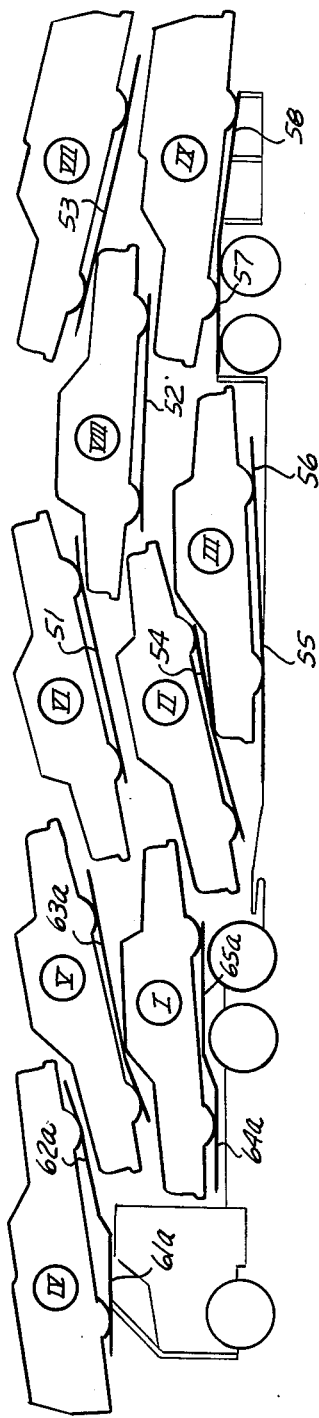
Figure 21:
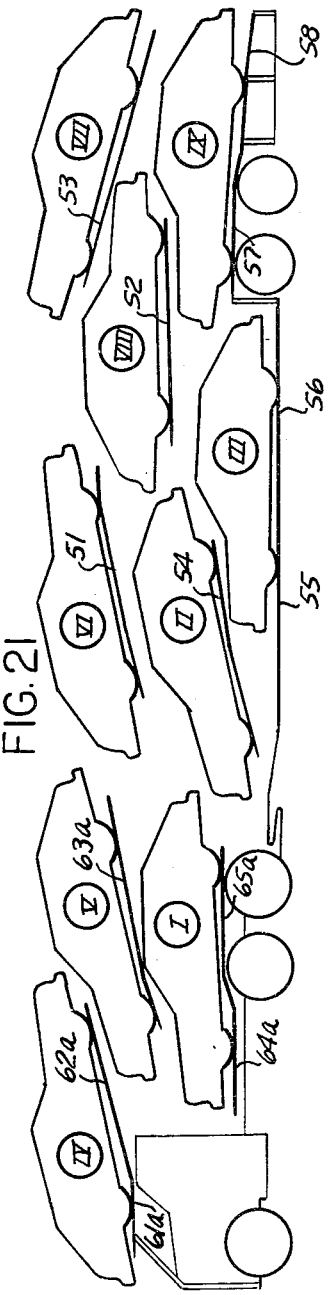

With respect to the loading of FIG. 19, it is done with a similar loading sequence to that described for FIGS. 20, 21, 23 and 26, hereinabove except that car IV is carried with its rear wheels resting on track 51 and its front wheels resting on track 52. A vehicle comparable to car VIII as shown in the earlier described loadings is not included.

Figure 27:
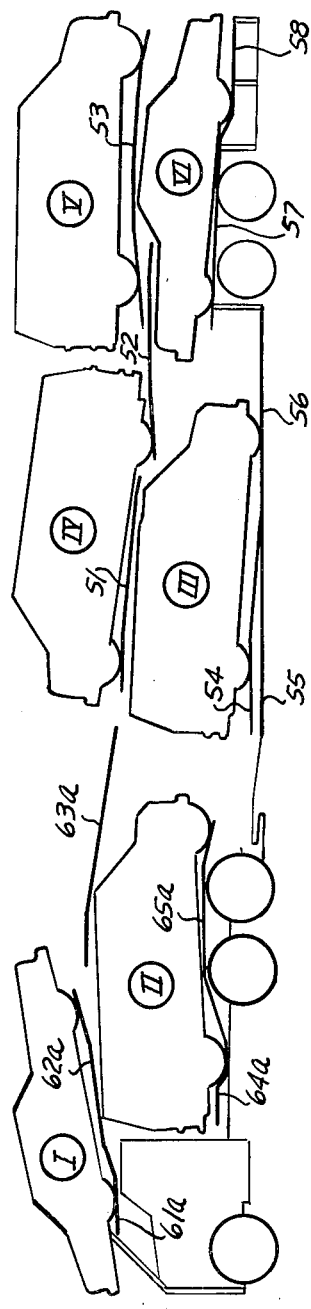

With regard to the loading of FIG. 27, the bottom track row and the upper track row are positioned as earlier described for FIGS. 20, 21, 23 and 26. After a jumper skid is placed to bridge tracks 63a and 51, vehicle I is backed into position. The skid is removed and track 63a raised to its extreme upper position. The front of vehicle I is overlifted to an extreme height position. A jumper skid is placed between tracks 65a and 54 and van II is backed into position with its rear wheels resting in the wheel pocket of track 64a. The jumper skid is removed and track 54 lowered to rest on top of track 55. The front of track 56 would be lowered to a position in line with permanent track 55 and van III is backed into position. The rear of the track 56 is then lowered to rest in line with track 55. Tracks 51, 52 and 53 are then aligned to allow for drive on of van IV. Van IV is carried with its front wheels resting on track 51 and its rear wheels resting on track 52. Van V is backed into position and track 53 overlifted to allow adequate clearance for car VI to be driven on over track 58. All tracks are then height adjusted and vehicles tied down for transport.

Figure 28:
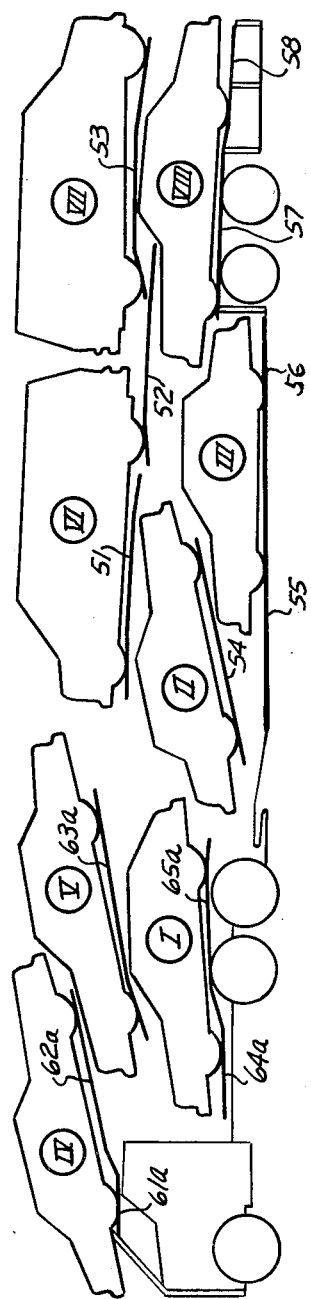

The loading for FIG. 28 will now be described. The procedure used is. The same as that previously described for FIG. 19 except for the van VI being driven on and carried with its front wheels resting on track 51 and its rear wheels resting on track 52. Vehicle VII, also a van, is backed on track 53. Vehicle VIII is driven on track 58 in a like manner to that shown in FIG. 19.

Figure 29:
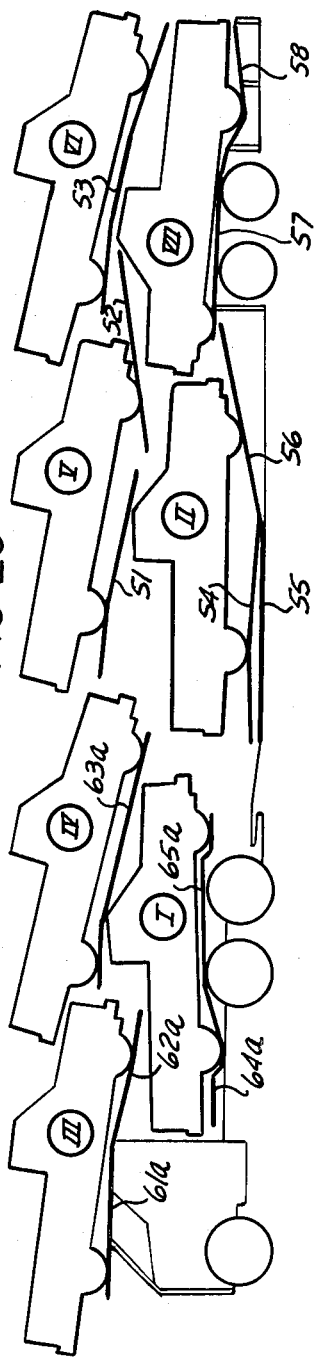

The loading procedure for FIG. 29 will now be considered. All tracks are initially adjusted in the manner previously described for FIGS. 20, 21, 23 and 26. The pickup truck I is then backed into position with the wheel pocket of track 64a open to receive the truck rear wheels. A jumper skid would then be positioned between the upper track 63a and the track 51. Track 54 would then be lowered down to rest on the top of the permanent track 55. The front of the track 56 would then be lowered into alignment with the rear of the track 55. Pickup truck II can then either be driven on or backed on. Track 56 can either be lowered at its rear or left elevated according to driver's option. With all upper tracks aligned in a horizontal relationship and jumper skids spanning the gap between trailer and tractor, the pickup truck III is backed into position. The track 62a would the be lowered and the pickup truck IV backed into position on the track 63a. Jumper skids are then removed and stored in a carrying position. The rear of the track 63 is then lowered and the front of track 51 raised. The tracks 51, 52 and 53 are properly aligned for loading pickup trucks V and VI. The pickup truck V is backed into position with its rear wheels resting on the track 51 and its front wheels resting on the track 52. The pickup truck V is then lowered so that the pickup truck VI can be loaded into position with its rear overlapping the hood of pickup truck V. Pickup truck VI after loading is overlifted in extreme position and pickup truck V is raised slightly to permit pickup truck VII to be driven into position on raised track 58. Once loaded, track 58 is lowered to provide the least possible height. All vehicles are then adjusted to within height requirements for over the road travel.

Figure 31:
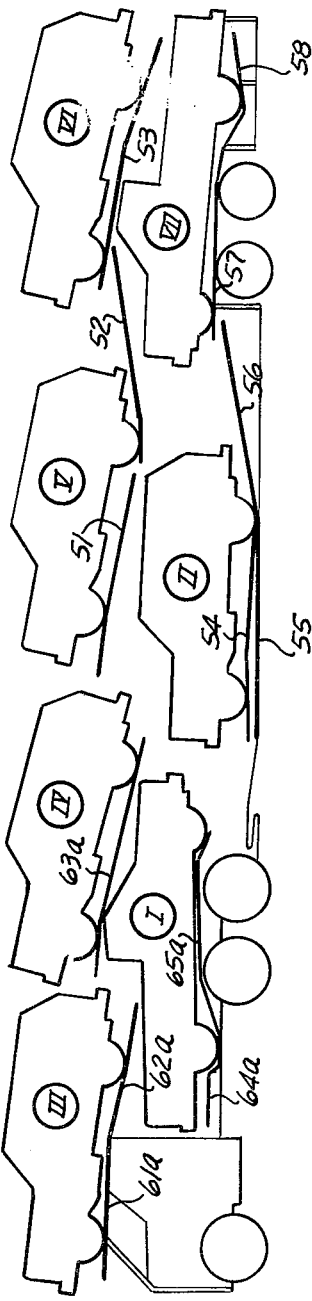

The loading of FIG. 31 would be the same as that just described for FIG. 29 except that vehicles III, IV, V and VI would be driven on instead of backed on.

It will thus be seen that I have provided by my inventtion a new and improved vehicle transport system of the stingersteered type which is characterized by its versatility and capability of handling a broad mix of standard vehicles, both passenger and commercial, which is not possible with prior art transport tractors and trailers. The novel arrangement of tracks both on the trailer and tractor make this advance possible.

I claim:

1. A vehicle transport system mounted on a tractor and trailer for carrying a plurality of vehicles comprising:
    a plurality of upper elevatable trailer tracks mounted on said trailer and operable to be height adjusted for loading and unloading;
    a plurality of lower trailer tracks mounted proximate the bed of said trailer;
    a first lower track mounted on said tractor and substantially aligned with the forwardmost of said pluarlity of lower tracks;
    a second upper track mounted on said tractor and substantially aligned with said plurality of upper trailer tracks; and a third upper track mounted on the cab of said tractor forwardly located and alignable relative to said second upper track; said last mentioned track further having a forward extensible track portion, said second upper track mounted on said tractor being attached to a tractor side panel and connected to an included fluid operated cylinder and rod assembly for raising and lowering said second upper track.

2. The combination as set forth in claim 1 wherein at least one fluid operated cylinder and rod assembly is operably connected to each of said plurality of upper elevatable trailer tracks for controlling its upper and downward movement.

3. The combination as set forth in claim 1 wherein said first lower track mounted on said tracktor comprises a stationary track.

4. The combination as set forth in claim 3 wherein said first lower track includes a wheelwell for retaining the wheels of a carried vehicle in place.

5. The combination as set forth in claim 1 wherein a further pair of elevatable tracks are mounted on said trailer intermediate said upper trailer tracks and said lower trailer tracks for further increasing the carry capacity of said system.

6. The combination as set forth in claim 1 wherein said plurality of upper elevatable tracks mounted on said trailer are four in number and wherein said plurality of said lower trailer tracks mounted proximate the bed of said trailer are three in number, each of said tracks mounted on said trailer being operable to carry a small size car.

7. The combination as set forth in claim 1 wherein the total number of said tracks mounted on said trailer are seven in number, each adapted to carry a small size car and wherein said tracks mounted on said tractor are each likewise operable to carry a small size car.

8. The combination as set forth in claim 1 wherein said upper elevatable tracks mounted on said trailer are adapted to carry a pair of rearward facing pickup trucks and wherein said plurality of lower trailer tracks are operable to carry a forward facing pickup truck and a rearward facing pickup truck and wherein each of said tracks mounted on said tractor is operable to carry a rearward facing pickup truck.

* * * * *